Patented June 10, 1941

2,245,208

UNITED STATES PATENT OFFICE 2,245,208

PROCESS OF PREPARING MIXED ESTERS OF CELLULOSE CONTAINING DICARBOXYLIC ACID GROUPS

Carl J. Malm and Carlton Lee Crane, Rochester, N. Y., assignors to Eastman Kodak Company, Rochester, N. Y., a corporation of New Jersey No Drawing. Application October 29, 1938, Serial No. 237,762

4 Claims. (Cl. 260—225)

This invention relates to the preparation of cellulose mixed esters containing fatty acid and dicarboxylic acid groups by reacting upon cellulose with both a fatty acid anhydride and a dicarboxylic acid anhydride in the presence of a tertiary organic base. This invention relates particularly to a process of preparing mixed esters of this type having a high dicarboxylic acid radical content.

In the manufacture of cellulose acetate phthalate, the method commonly employed at the present time consists in treating a hydrolyzed cellulose acetate with phthalic anhydride in the presence of pyridine, as described and claimed in Malm and Waring Patent No. 2,093,462, patented September 21, 1937. The cellulose acetate phthalate prepared by this method has a relatively high acetyl content due to the fact that ordinary commercial cellulose acetate is employed as a starting material. As the number of free and esterifiable hydroxyl groups in this starting material is small, the amount of phthalyl, which can be introduced, is limited thereby. By this method, if cellulose acetate phthalate, having a low acetyl and high phthalyl content, is desired, it is necessary that the cellulose acetate employed, as the starting material, have a low acetyl content, such as one which has been hydrolyzed down to water solubility or water susceptibility. This method of obtaining high phthalyl cellulose acetate phthalate would involve considerable expense, due to the special treatment necessary to prepare the starting material and also the necessity of isolating the cellulose acetate before its phthalylation.

One object of our invention is to provide a method of preparing high phthalyl mixed esters of cellulose in which both dicarboxylic acid groups and fatty acid groups are introduced into the cellulose simultaneously. Another object of our invention is to provide a simple, inexpensive process of preparing cellulose mixed esters having a high content of dicarboxylic acid radicals. A further object of our invention is to provide a method of making mixed esters of cellulose containing fatty acid groups and a high content of dicarboxylic acid groups in which the ester may be satisfactorily precipitated from its reaction mixture with an aqueous liquid.

We have found that both fatty acid groups and dicarboxylic acid groups can be introduced simultaneously into cellulose in the presence of each other and at least a small amount of a tertiary organic base. We prefer to employ a low viscosity cellulose, such as one having a cuprammonium viscosity of 10–50 C. P. S. as the starting material. This cellulose is preferably swollen before it is subjected to esterification. The swollen fibers are then added to a mixture of low fatty acid anhydride, a dicarboxylic acid anhydride and a tertiary organic base. The resulting product, especially if a substantial proportion of dicarboxylic acid anhydride is used, will contain a substantial phthalyl content. Although our invention is not limited only to the preparation of mixed esters having a high dicarboxylic acid content, it is particularly directed thereto due to its unique value for this purpose.

As pointed out above, it is preferred that a cellulose, which has been swollen, be used as the starting material. This swelling may be carried out in any known manner which is compatible with the carrying out of an esterification, in accordance with our invention. The cellulose may be swollen by heating it with glacial acetic acid, such as at 100° F. for four hours. The cellulose may also be swollen by soaking it in water or by taking a wet cellulose and dehydrating it with an organic solvent, such as acetic acid, ethyl methyl ketone, or 1–4 dioxan prior to the esterification. The dehydration may also be carried out using a volatile solvent which can easily be removed from the cellulose prior to the esterification step. If the organic solvent, such as acetic acid or methyl ethyl ketone, is compatible with the esterification step, its removal from the cellulose is unnecessary. Where pyridine or some like base is used, it can act not only to promote the reaction but also as a solvent. It is preferred to replace part of the pyridine with another solvent, such as methyl ethyl ketone, which is cheaper and is more easily recovered than pyridine. Other tertiary organic bases, such as quinoline, or alpha picoline, may be employed instead of pyridine and will give very satisfactory results.

Our process may be employed for various mixed esters of cellulose, the acyl of which essentially consists of lower fatty acid groups, such as acetyl, propionyl or butyryl and dicarboxylic acid groups, such as phthalyl, succinyl or the like. Some of the compounds, which may be prepared in accordance with our process, are cellulose propionate phthalate, cellulose butyrate phthalate and cellulose acetate succinate. Our process is valuable for the preparation of the esters containing propionyl or butyryl, as the hydrolysis of propionic or butyric acid esters of cellulose is not necessary by our process, as would be the case if processes of the prior art were followed, The following examples illustrate the preparation of mixed esters of cellulose, containing a high dicarboxylic acid content, in accordance with our invention:

*Example I*

25 parts of cellulose, which was swollen with water and dehydrated by means of glacial acid, were mixed with a mixture of 200 parts of pyridine, 40 parts of phthalic anhydride and 30 parts of acetic anhydride and the mass was maintained at 100° C. for 24 hours. A clear solution resulted. The cellulose acetate phthalate formed was isolated by precipitation in water containing sufficient hydrochloric acid to combine with all the pyridine (either combined or uncombined) present. The product was then washed thoroughly in distilled water and, upon analysis, was found to contain 18.2% acetyl and 31.6% phthalyl.

*Example II*

The above procedure was repeated except that 45 parts of phthalic anhydride and 20 parts of acetic anhydride were employed. The resulting product contained 10% acetyl and 39.3% phthalyl.

*Example III*

Example I was again repeated using 50 parts of phthalic anhydride and 10 parts of acetic anhydride. The resulting product was found to contain 7.1% acetyl and 45.8% phthalyl.

As pointed out above, our invention is particularly useful for the preparing of cellulose esters, having a high dicarboxylic acid radical content, such as where the amount of dicarboxylic acid anhydride is at least equal to the amount of fatty acid anhydride present. Solvent may replace part of the tertiary organic base used, if desired. Solvents, such as methyl ethyl ketone, cyclohexanone, dioxane or even acetone, are suitable for this purpose, although in the case of lower boiling solvents it is desirable to use refluxing conditions or carry the reaction out in an enclosed vessel to avoid loss of solvent. The cellulose employed, as the starting material, may be any type of cellulose ordinarily employed, as the starting material, for esterification processes, such as refined high alpha cellulose wood pulp or the like.

The cellulose esters prepared by our process, having a high content of dicarboxylic acid radicals, are especially valuable for use as temporary backings on photographic film, such as an antihalation backing, as, due to their extremely high solubilities in alkalies, they may be easily removed in the developing of the film. In any case, in which high solubility in aqueous alkali is an advantage, these esters would be useful.

We claim:

1. The process of preparing a cellulose ester containing acetyl and dicarboxylic acid groups, which comprises subjecting cellulose having a cuprammonium viscosity of 10-50 C. P. S. to a swelling treatment, esterifying the swollen cellulose containing substantially no moisture with a mixture essentially consisting of acetic anhydride, a dicarboxylic acid anhydride, a tertiary organic base and methyl ethyl ketone.

2. The process of preparing a cellulose ester containing acetyl and dicarboxylic acid groups, which comprises subjecting cellulose having a cuprammonium viscosity of 10-50 C. P. S. to a swelling treatment, esterifying the swollen cellulose containing substantially no moisture with a mixture essentially consisting of acetic anhydride, phthalic anhydride, a tertiary organic base and methyl ethyl ketone.

3. The process of preparing a cellulose ester containing acetyl and dicarboxylic acid groups, which comprises subjecting cellulose having a cuprammonium viscosity of 10-50 C. P. S. to a swelling treatment, esterifying the swollen cellulose containing substantially no moisture with a mixture essentially consisting of acetic anhydride, succinic anhydride, a tertiary organic base and methyl ethyl ketone.

4. The process of preparing a cellulose ester containing acetyl and dicarboxylic acid groups, which comprises subjecting cellulose having a cuprammonium viscosity of 10-50 C. P. S. to a swelling treatment, esterifying the swollen cellulose containing substantially no moisture with a mixture essentially consisting of acetic anhydride, a dicarboxylic acid anhydride, pyridine, and methyl ethyl ketone.

CARL J. MALM.
CARLTON LEE CRANE.